(12) United States Patent
Woyach et al.

(10) Patent No.: US 6,428,436 B1
(45) Date of Patent: Aug. 6, 2002

(54) DRIVE SPROCKET WITH RELIEF AREAS

(75) Inventors: Dennis Woyach, Milwaukee; Kevin Hansen, Grafton, both of WI (US)

(73) Assignee: Rexnord Corporation, Milwaukee, WI (US)

( * ) Notice: Subject to any disclaimer, the term of this patent is extended or adjusted under 35 U.S.C. 154(b) by 0 days.

(21) Appl. No.: 09/558,177

(22) Filed: Apr. 26, 2000

Related U.S. Application Data

(60) Provisional application No. 60/131,152, filed on Apr. 27, 1999.

(51) Int. Cl.[7] .................................................. F16H 55/30
(52) U.S. Cl. ......................................... 474/152; 474/160
(58) Field of Search ................................. 474/160, 162, 474/202, 148, 152, 92, 93, 95, 96, 97; 74/457, 462, 89.21, 665 GE; 83/835

(56) References Cited

U.S. PATENT DOCUMENTS

| 1,354,553 | A |   | 10/1920 | Harter |  |
|---|---|---|---|---|---|
| 1,613,702 | A | * | 1/1927 | Hammar | 74/462 |
| 2,114,146 | A |   | 4/1938 | Klein | 198/182 |
| 3,495,468 | A | * | 2/1970 | Griffel | 474/157 |
| 3,880,478 | A | * | 4/1975 | Baylor | 305/13 |
| 3,881,365 | A | * | 5/1975 | Hardy | 74/462 |
| 3,916,716 | A | * | 11/1975 | Rix et al. | 74/461 |
| 4,148,225 | A | * | 4/1979 | Redmond, Jr. et al. | 74/243 |
| 4,218,932 | A | * | 8/1980 | McComber | 474/161 |
| 4,506,559 | A |   | 3/1985 | Francke et al. | 74/439 |
| 4,522,611 | A | * | 6/1985 | Hiatt | 474/162 |
| 4,631,974 | A |   | 12/1986 | Wiegand et al. | 74/450 |
| 4,832,187 | A |   | 5/1989 | Lapeyre | 198/851 |
| 4,865,183 | A |   | 9/1989 | Schroeder et al. | 198/834 |
| 4,955,850 | A | * | 9/1990 | Lee | 474/92 |
| 4,970,789 | A | * | 11/1990 | Bell | 30/384 |
| 5,021,033 | A | * | 6/1991 | Sundstrom | 474/152 |
| 5,037,356 | A |   | 8/1991 | Gladczak et al. | 474/95 |
| 5,074,406 | A |   | 12/1991 | Gundlach et al. | 198/834 |
| 5,098,348 | A | * | 3/1992 | O'Neel | 474/157 |
| 5,170,883 | A |   | 12/1992 | Ledet et al. | 198/834 |
| 5,263,575 | A |   | 11/1993 | Ledet | 198/834 |
| 5,279,526 | A |   | 1/1994 | Gunlach | 474/95 |
| 5,295,917 | A |   | 3/1994 | Hannum | 474/95 |
| 5,316,522 | A |   | 5/1994 | Carbone et al. | 474/95 |
| 5,322,478 | A |   | 6/1994 | Bos et al. | 474/95 |
| 5,378,203 | A |   | 1/1995 | Baebel | 474/96 |
| 5,389,044 | A |   | 2/1995 | Bandy, Jr. et al. | 474/96 |
| 5,393,271 | A |   | 2/1995 | Sands | 474/96 |
| 5,490,814 | A | * | 2/1996 | Whitenight | 474/92 |
| 5,848,564 | A | * | 12/1998 | Vaagen | 83/853 |
| 6,086,495 | A |   | 7/2000 | Stebnicki et al. | 474/96 |

FOREIGN PATENT DOCUMENTS

| DE | 4433557 C | 12/1995 | B65G/17/40 |
|---|---|---|---|
| DE | 19548662 C | 4/1997 | B65G/17/40 |
| DE | 19817125 A | 10/1999 | B65G/17/40 |
| EP | 0323420 A | 7/1989 | F16H/55/30 |
| EP | 0823390 A | 2/1998 | B65G/23/06 |

* cited by examiner

Primary Examiner—David A. Bucci
Assistant Examiner—Timothy McAnulty
(74) Attorney, Agent, or Firm—Quarles & Brady LLP

(57) ABSTRACT

A drive sprocket for use with a belt module having a lower surface, and a pocket formed in the lower surface having a drive surface and a recessed surface includes a base having an outer periphery rotatable about an axis, and a plurality of teeth extending radially from the outer periphery. Relief areas formed between the teeth collect particles falling from the belt. At least one tooth includes a drive surface for engaging the module drive surface, and a top. Tooth sides extend from the top and toward said base.

5 Claims, 3 Drawing Sheets

DRIVE SPROCKET WITH RELIEF AREAS

CROSS REFERENCES TO RELATED APPLICATIONS

This application claims the benefit of U.S. Provisional Patent Application No. 60/131,152 filed on Apr. 27, 1999.

STATEMENT REGARDING FEDERALLY SPONSORED RESEARCH

Not Applicable

BACKGROUND PRIOR ART

Pasteurizers used in the brewing industry include large enclosures or tunnels measuring up to 20 feet wide by 100 feet long. Modular belting is used to carry glass bottles or containers of liquid to be pasteurized through the tunnel. Water is sprayed onto the bottles as they move through the tunnel to control the temperatures of the product. The tunnel includes a number of temperature zones such that the temperature of the product in the bottles is raised to the pasteurization temperature, maintained at that temperature for a predetermined time, and then reduced to room temperature.

Problems arise in the pasteurizers due to bottle breakage caused by poor glass quality and/or temperature swings as the bottles are moved through the pasteurizer heating zones on the modular conveyor belt. Broken glass is hard and abrasive, and can lead to the destruction and wear of the plastic modular belt. The broken glass particles work their way through the drainage holes in the modular belting. The glass particles build up on the conveyor belt drive sprockets and become embedded in the teeth of the drive sprockets as the chain articulates over the sprockets. Severe build up of the glass particles on the sprockets leads to improper engagement of the chain with the sprockets, and this can cause the belt to jump teeth on the sprocket, poor tracking of the modular belt, and even catastrophic damage to the modular belting. An additional problem caused by the broken glass is excessive wear of the sprockets and belt modules.

SUMMARY OF THE INVENTION

The invention provides an improved sprocket design for use with modular belting and particularly modular belting of the type used in pasteurizers to convey containers through the pasteurizer. The sprocket includes a base having an outer periphery rotatable about an axis, and a plurality of teeth extending radially from the outer periphery. At least one tooth includes a drive surface for engaging the module drive surface, and a top having a portion sloping away from the drive surface toward the base. Tooth sides extend from said top and toward said base.

A general objective of the present invention is to reduce the likelihood of trapping particles between the teeth and belt module, thus eliminating the build up of abrasive media between the two components. This is accomplished by providing a tooth profile which engages the module to drive the belt, and to space the belt from the sprocket body.

Another objective of the present invention is to provide a tooth profile which guides particles away from the module when engaged by the teeth. This objective is accomplished by providing surfaces on the tooth which do not engage the module and guide the particles away from the module.

Yet another objective of the present invention is to provide a sprocket which can collect particles between the teeth without adversely affecting sprocket performance. This objective is accomplished by providing a sprocket having relief areas formed between the sprocket teeth to collect particles falling from the belt module.

The foregoing and other objects and advantages of the invention will appear from the following description. In the description, reference is made to the accompanying drawings which form a part hereof, and in which there is shown by way of illustration a preferred embodiment of the invention.

DESCRIPTION OF A PREFERRED EMBODIMENT

Figure 1:
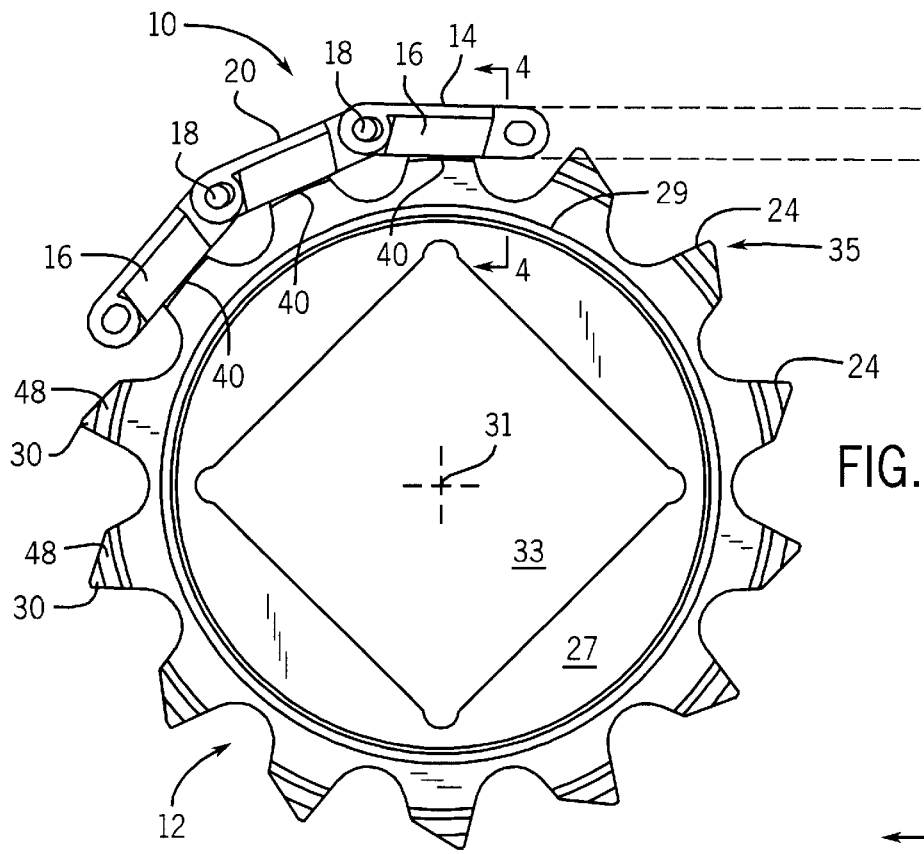
FIG. 1 is an elevation view of a modular belt engaging a sprocket embodying the present invention.
Figure 2:
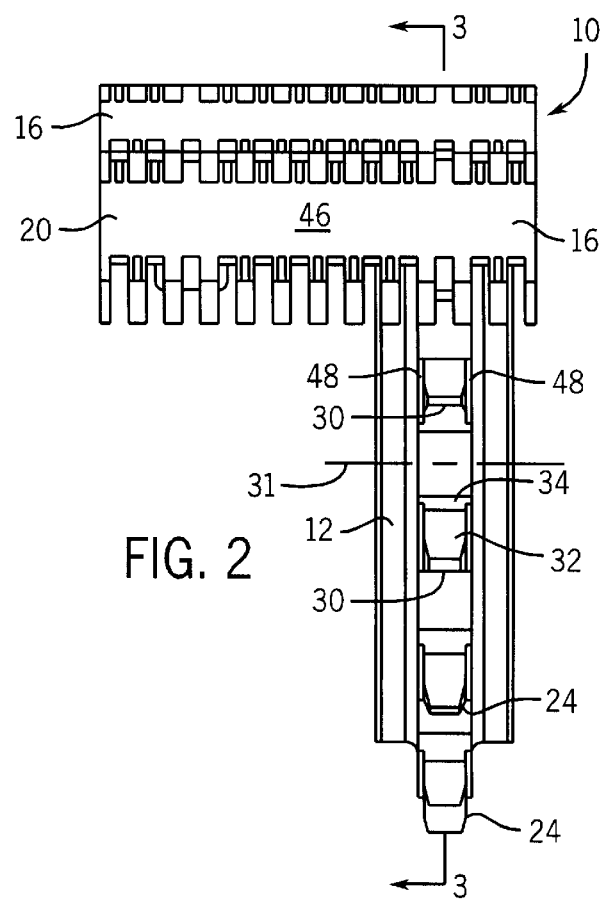
FIG. 2 is a top plan view of the chain and sprocket illustrated in FIG. 1.

As shown in FIGS. 1 and 2, a sprocket driven conveyor belt 10 of the type used in a conveyor for a pasteurizer, is formed from belt modules 16. The continuous belt 10 is driven by a drive sprocket 12 having teeth 24 which engage each module 16 to urge the belt 10 in a desired direction from a conveyor head end (not shown) to a conveyor tail end (not shown). The sprocket teeth 24 have a novel tooth profile which reduces a build up of particles on the belt module 16 and sprocket 12.

The modular conveyor belt 10 is made up of a large number of adjacent modules 16 joined together transversely and in the direction of conveyor travel by hinge pins 18. The modules 16 form a conveyor product supporting surface 20 which may be 20 feet or more wide and 100 feet or more long. The product supporting surface 20 is upwardly facing when transporting products, such as glass bottles or other containers, and downwardly facing when the modules are returning from the conveyor tail end to the head end.

Each belt module 16 includes an upper surface 14 defining the product supporting surface 20 and a lower surface 40. As shown in FIG. 2, the belt module upper surface 14 has a solid center upper surface 46 portion. Although a solid upper center surface 46 is shown, the module 16 can include a plurality of openings for the flow of air or liquid through the belt during its operation without departing from the scope of the present invention.

Figure 3:
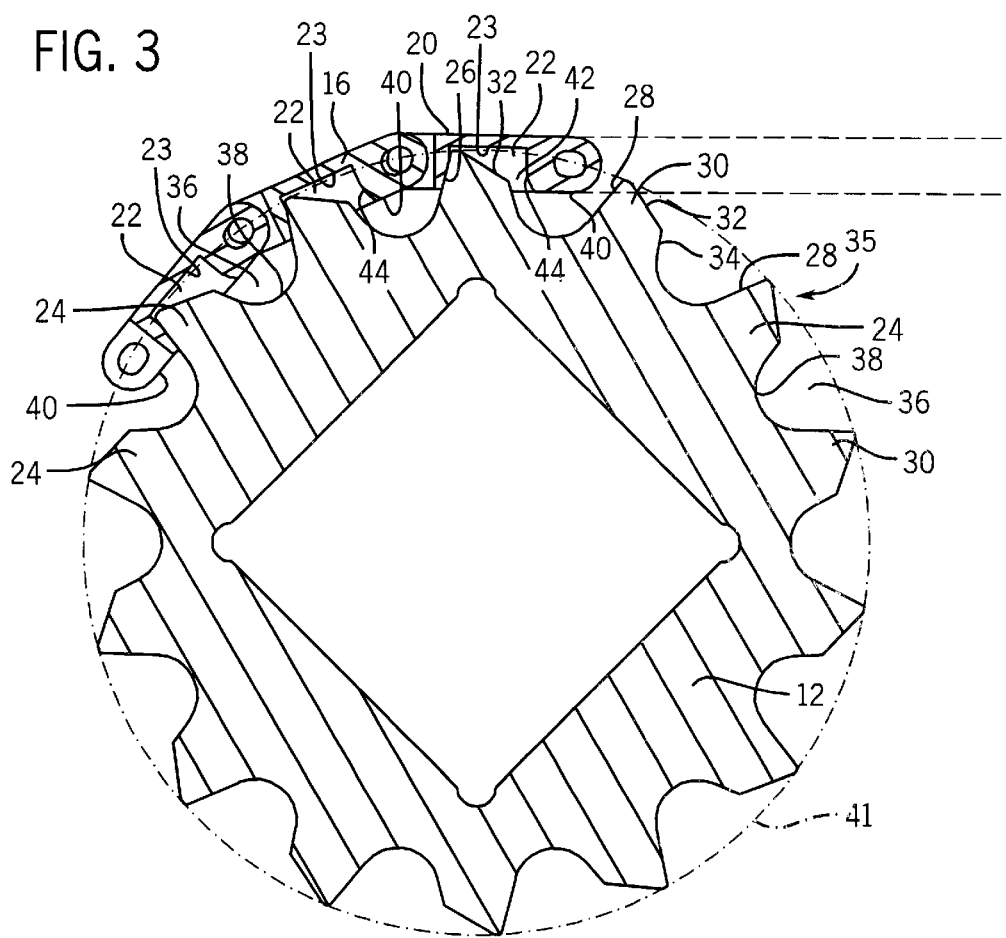
FIG. 3 is a cross-section view taken along line 3—3 in FIG. 2.
Figure 4:
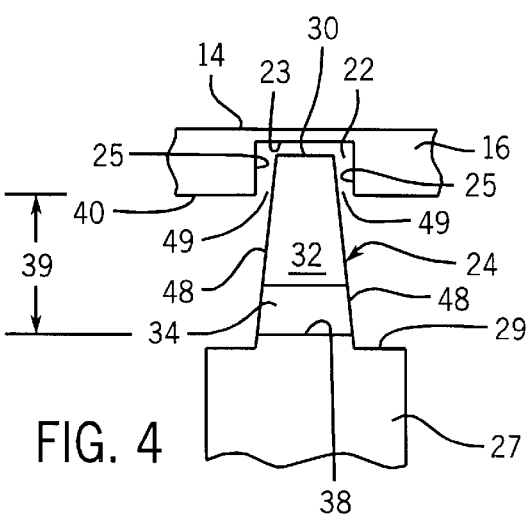
FIG. 4 is a cross-section view taken along line 4—4 of FIG. 1.

As shown in FIGS. 3 and 4, a cavity or pocket 22 formed in the module lower surface 40 is adapted to engage the drive sprocket teeth 24. The pocket 22 is downwardly open when the belt module 16 is traveling from the conveyor head end to the tail end, and is upwardly open when the belt module 16 is traveling from the tail end back to the head end. The pocket 22 includes a drive surface 26 and trailing surface 44 joined by a recessed surface 23 and pocket sides 25. The curved drive surface 26 engages the sprocket tooth 24 such that the rotating drive sprocket 12 drives the modular belt 10 in the desired direction of travel. Preferably, when the sprocket is engaged with the module 16, the pocket recessed surface 23 is substantially tangential to the sprocket outside diameter 41. Of course, the scope of the claims include a sprocket engaging a module which does not include a solid upper center surface, and the pocket is an opening (without a recessed surface) having a drive surface for engaging the sprocket tooth.

In the embodiment shown in FIGS. 1 and 2, the sprocket includes a disc-shaped body 27 having an outer periphery 29, and fourteen teeth 24 spaced about the periphery 29. The body 27 is mounted on a shaft (not shown) which extends through an aperture 33 formed in the body 27 coaxial with a sprocket axis of rotation 31. The shaft supports and rotatably drives the sprocket 12 about the sprocket axis 31. Preferably, the shaft can support a number of drive sprockets 12 spaced apart along its length with each of the drive sprockets 12 engaging a belt module 16. Although fourteen teeth 24 are disclosed herein, any number of teeth can be provided without departing from the scope of the present invention.

The aperture 33 is shaped to engage the shaft, such that the shaft rotatably drives the sprocket 12 to urge the conveyor belt 10 in the desired direction of travel. Preferably, the shaft is generally square in cross section, and is received in a generally square aperture. However, other configurations, such as a circular aperture receiving a shaft having a circular cross section and a key can be used without departing from the scope of the present invention.

Referring to FIGS. 3 and 4, the sprocket teeth 24 extend radially outward from the sprocket base outer periphery 29. The teeth are separated by radially outwardly open relief sections 36 having a curved bottom 38. The bottom 38 of each relief section 36 is spaced radially inward toward the sprocket axis to define a gap 39 (shown in FIG. 4) between the lower surface 40 of the engaged belt module 16 and the relief section bottom 38 when the tooth engages the module pocket 22. When the relief section 36 is adjacent an engaged sprocket tooth 24, the relief section 36 forms a receptacle for particles falling from the pocket 22, and the gap 39 provides a path out of the receptacle and off of the sprocket 12, thus reducing the potential of the particles building up on the sprocket 12.

As best shown in FIGS. 3 and 4, each sprocket tooth 24 is shaped to urge the conveyor in the desired direction of travel, and facilitate self removal of particles from the module pockets 22. Each tooth 24 includes a forward drive surface 28, a top 35, a rear surface 34, and opposing sides 48. The forward drive surface 28 is generally planar, and engages the curved surface 26 of the belt module pocket 22. Advantageously, the interface between the planar drive surface 28 and the curved pocket drive surface 26 produces a smooth rolling engagement between the sprocket tooth 24 and the pocket drive surface 26 as the module 16 engages the sprocket 12.

Preferably, tension in the chain prevents the tooth drive surface 28 from slipping relative to the pocket surface 26 to maintain the gap 39 between the module 16 and the relief section bottom 38. The gap 39 provides a path for particles to escape from the pocket 22 through a space 42 between the pocket trailing surface 44 and sprocket tooth 24.

The top 35 of each tooth 24 includes a relatively small flat crown 30, and a rearwardly sloping rearward portion 32. By providing a relatively small crown 30, that is, a crown 30 which comprises less than half of the tooth top 35 surface area, the potential of trapping a particle between the tooth 24 and pocket recessed surface 23 is reduced. Preferably, the crown area is less than one fourth of the tooth top surface area.

The tooth top rearward portion 32 slopes downwardly and rearwardly from the crown 30 toward the tooth rear surface 34, and reduces the potential for particles becoming trapped between the tooth top rearward portion 32 and the pocket 22. Advantageously, the tooth top rearward portion guides 32 the particles out of the pocket 22 and through the space 42 formed between the tooth 24 and pocket trailing edge 44. The tooth rear surface 34 extends from the top rear portion 32 and merges into the sprocket relief section bottom 38.

Preferably, as best shown in FIG. 4, the tooth sides 48 are chamfered from the crown 30 to further allow particles to exit the pocket 22. The opposing sides 48 are separated by a distance in the sprocket axial direction which increases as the sides 48 extend away from the tooth top 35 toward the sprocket rotational axis to form inclined surfaces. The inclined surfaces define a gap 49 between the tooth sides 48 and the pocket sides 25 when the tooth 24 is engaged with the pocket 22 to facilitate movement of particles away from the sprocket tooth 24 and out of the pocket 22.

In use, particles, such as broken glass collect in the upwardly open module pockets 22 as the modules 16 return from the conveyor tail end to the head end. When the sprocket tooth 24 engages the module pocket 22, and inverts the pocket 22 to face downwardly, the tooth top 35, rear surface 34, and sides 48 guide the particles out of the pocket 22. Particles that fall into the relief sections 36 between the teeth 24 can then drop away from the sprocket 12 through the gap 39 between the sprocket body 27 and belt 10 such that they do not become wedged between the sprocket and the modular belt 10.

Because the particles can fall into the relief areas 36 of the sprocket 12, and then away from the sprocket 12, the particles will not build up on the sprocket 12 or on the lower surface 40 of the modules 16. Accordingly, the particles do not push the belt 10 away from the sprocket 12 or otherwise cause the belt 10 to disengage from the sprocket 12 or fail to track properly on the sprocket 12. Furthermore, by not allowing a build up of particles on the sprocket 12, the particles will not interfere with the driving engagement of the sprocket teeth 24 with the drive surface 26 of the modules. The opposed drive surfaces 26, 28 between the sprocket teeth 24 and the drive pockets 22 of the modules 16 will maintain the proper face to face driving engagement such that the sprocket 12 can efficiently drive the modular belt 10.

Figure 5:
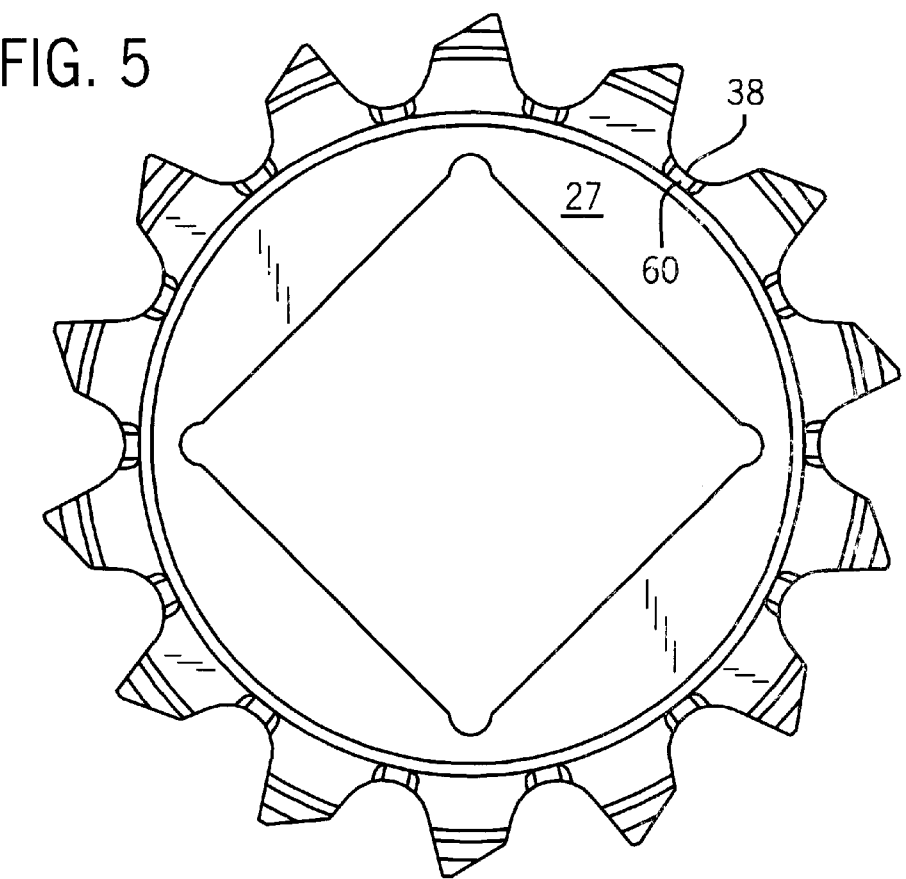
FIG. 5 is an elevation view of a sprocket including angled surfaces extending from relief areas.
Figure 6:
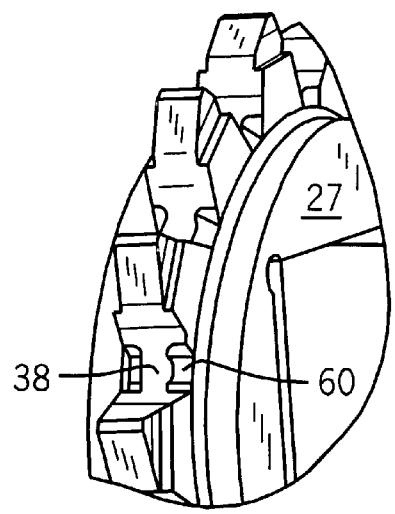
FIG. 6 is a perspective detailed view of the angled surfaces FIG. 5.

While there has been shown and described what is at present considered the preferred embodiment of the invention, it will be obvious to those skilled in the art that various changes and modifications can be made therein without departing from the scope of the invention. For example, as shown in FIGS. 5 and 6, a chamfer or angled surface 60 can be provided which extends laterally outward and toward the sprocket base 27 from the relief area bottom 38. This angled surface 60 provides an improved escape path for particles which have fallen into the relief area 36.

We claim:

1. A drive sprocket for use with a belt module having a lower surface, and a pocket formed in the lower surface having a drive surface and a recessed surface, said sprocket comprising;
   a base having an outer periphery and rotatable about an axis;
   a plurality of teeth extending radially from said outer periphery, wherein at least one tooth includes a drive surface for engaging a module pocket drive surface, and a top joined to said drive surface; and
   relief areas between said teeth for receiving particles falling from the belt, wherein each of said relief areas include a bottom defined by opposing axially facing sides extending toward said base, and at least one of said axially facing sides is an angled surface extending axially outwardly and radially inwardly toward said base from said bottom of said at least one of said relief areas.

2. The drive sprocket of claim 1, in which at least one of said teeth includes chamfered sides.

3. The drive sprocket of claim 1, in which at least one of said teeth includes a top having a crown and a sloping portion extending rearwardly from said crown.

4. The drive sprocket of claim 3, in which said tooth top crown has a surface area and said tooth top sloping portion has a surface area, wherein said surface area of said tooth top crown is less than said surface area of said sloping portion.

5. The drive sprocket of claim 4, in which said surface area of said tooth top crown is less than one fourth of said surface area of said sloping portion.

* * * * *